United States Patent [19]

Moon et al.

[11] Patent Number: 4,772,974
[45] Date of Patent: Sep. 20, 1988

[54] COMPACT HEAD AND DISK ASSEMBLY

[75] Inventors: William G. Moon, Sunnyvale; Donald C. Westwood, Cupertino; Thomas R. Stone, Pleasanton, all of Calif.

[73] Assignee: Plus Development Corporation, Milpitas, Calif.

[21] Appl. No.: 55,375

[22] Filed: May 29, 1987

Related U.S. Application Data

[62] Division of Ser. No. 741,178, Jun. 4, 1985, Pat. No. 4,712,146.

[51] Int. Cl.$^4$ .................... G11B 5/012; G11B 17/00
[52] U.S. Cl. ........................................ 360/98; 360/69
[58] Field of Search ........................... 360/97–99, 360/77–78, 104, 106, 69, 88

[56] References Cited

U.S. PATENT DOCUMENTS

| | | | |
|---|---|---|---|
| 4,196,456 | 4/1980 | Manzke et al. | 360/106 |
| 4,346,416 | 8/1982 | Riggle et al. | 360/106 |
| 4,439,792 | 3/1984 | van de Bult | 360/106 |
| 4,568,988 | 2/1986 | McGinlay et al. | 360/77 |

FOREIGN PATENT DOCUMENTS 0055568  7/1982  European Pat. Off. .

OTHER PUBLICATIONS

Electronic Products, Jan. 1985, pp. 23–24, "Micro Winchester Loves Abuse".
Rodime 350 Series Disk Drives, 1985, the Standard--Setting 3½" Winchester.
Product Brochure, Plus Development Corp., Milpitas, CA "Hardcard 40 the Leading High-Performance Hard Disk Expansion Board", (1987).
Product Brochure, Miniscribe Corp., Longmont CO, "ScribeCard 25.6 or 38.4 MByte Drive-on-a-Card", (1986).

Primary Examiner—John H. Wolff
Attorney, Agent, or Firm—David B. Harrison

[57] ABSTRACT

A compact, sealed head and disk assembly for a rotating non-removable disk data storage subsystem includes a flat and thin rigid generally rectangular box housing having a length not greater than approximately 173 millimeters, a width not greater than approximately 102 millimeters and a height not greater than approximately 24.5 millimeters,; a thin spindle motor mounted within the form factor of the housing; at least one magnetic media data storage disk having a diameter of approximately 95 millimeters in the housing and mounted directly to the spindle for rotation; a limited angular displacement rotary actuator subassembly including a substantially planar limited displacement rotary actuator motor; and, a cover for closing and sealing the housing.

15 Claims, 7 Drawing Sheets

WIRE # :
FUNCTION :

COMPACT HEAD AND DISK ASSEMBLY

This is a divisional of U.S. patent application Ser. No. 06/741,178, filed on June 4, 1985, now U.S. Pat. No. 4,712,146.

BACKGROUND OF THE INVENTION

The present invention relates to rotating non-removable disk data storage peripheral equipment for digital computers and similar host environments. More specifically, the present invention relates to a highly compact, thin head and disk assembly for a disk drive data storage subsystem.

REFERENCE TO RELATED PATENTS AND APPLICATIONS

The following issued patents and copending patent applications are pertinent to the present invention:

U.S. Pat. No. 4,396,959, now U.S. Pat. No. Re. 32,075;

U.S. pat. application Ser. No. 06/806,082, now U.S. Pat. No. 4,639,798, which is a continuation of U.S. patent application Ser. No. 06/444,523 filed on Nov. 26, 1982, now abandoned.

U.S. patent application Ser. No. 06/728,674 filed on Apr. 29, 1985, now U.S. Pat. No. 4,647,997 the disclosure of which is hereby incorporated by reference.

U.S. patent application Ser. No. 07/741,179, filed on the same date as this application for Improved Optical Encoder Assembly;

Compact, non-removable rotating disk data storage devices are known in the prior art. Such disks, employing flying head (Winchester) technology, are capable of randomly storing and retrieving vast amounts of digital information very efficiently and rapidly.

Typical devices of the prior art have been packaged as rectangular boxes, usually having predetermined standard size dimensions. Standard package sizes have been adopted for eight inch diameter disk drives, and five and one quarter inch diameter disk drives, with variations usually only in the height dimension. Thus, a so-called "full height" five and one quarter inch disk drive typically follows a standardized form factor of eight inches in length, 5.75 inches in width and 3.38 inches in height. A "half height" five and one quarter inch disk drive typically follows a standardized form factor identical with the full height version, except for having one half of the full height dimension, or 1.69 inches in height.

Conventional practice heretofore has been to provide one or a few standard spaces in a computer for disk drive appliances. Since the computer user must be provided with convenient access to floppy disk drives in order to exchange floppy data storage diskettes, most computers provide for cabinet openings and positions in the front in order to accomodate floppy disk drives.

Subsequent practice has been to install fixed disk drives, and streaming tape backup drives as well, in one or more of the openings originally contemplated for floppy disk drives.

Disk drives, whether fixed or floppy, having their own head position control electronics, have usually been packaged separately from drive controller electronics, and have been connected to such controller electronics by cables. Some controllers have been adapted to plug directly into a computer backplane or motherboard, and others have required separate interface cards and further cables.

Controller/interface electronics have typically been assembled on specially designed printed circuit cards which plug into accessory sockets provided in the computer for accessory equipment, such as disk drive controllers, video display and graphics boards, additional memory boards, serial data ports, local area networks, modems, analog to digital converters, and the like. These accessary sockets are commonly provided in the backplane of the mainframe, or on the motherboard of smaller computers, such as so-called personal computers. One representative example is the IBM PC$^{tm}$ personal computer.

The smaller, personal computers usually have a limited number of accessory sockets provided on the motherboard. These few sockets are spaced closely together, typically on one inch centers. Because of the closeness of spacing, heretofore it has not been practical to consider placing a high data capacity fixed disk drive in the narrow space provided for a plug-in accessory board. Other computers provide very little space for additional peripheral equipment, and what space there is must be used to full advantage.

A hitherto unsolved need has therefore arisen for a high data storage capacity (ten megabytes or greater), high performance, very low power consuming fixed disk drive having a sufficiently thin height dimension so that the drive will be able to fit within narrower rectangular spaces than heretofore occupied by disk drives as found in small computer systems.

SUMMARY OF THE INVENTION WITH OBJECTS

A general object of the present invention is to provide a compact head and disk assembly for a fixed disk drive data storage subsystem which overcomes the limitations and drawbacks of the prior art.

One specific object of the present invention is to enclose a compact head and disk assembly for a high data storage capacity (e.g. ten megabyte) fixed disk drive in a generally rectangular box-shaped housing which is thinner in its height dimension than heretofore known, (e.g. approximately 6¾ inches in length (173 mm), approximately 4 inches in width (102 mm) and approximately one inch high (24.5 mm).

Another object of the present invention is to provide a thin direct drive spindle motor having a grounding connection for grounding the data storage disk to the housing which is located coaxially within the spindle itself, thereby facilitating the compactness of the head and disk assembly.

A further object of the present invention is to provide a low profile, mass balanced, limited displacement rotary actuator and motor for driving the data read/write transducers among selected concentric data tracks formed on the disk surface, in which the actuator's moving frame lies substantially within a single plane.

One other object of the present invention is to provide a single crash stop post which engages opposite sidewalls of an interior opening of the rotary actuator frame to limit displacement of the actuator to its intended range.

Another object of the present invention is to pass airflow generated by disk rotation through a small filter located in the airflow path.

A still further object of the present invention is to provide a low mass, auxiliary disk on the disk spindle in order to improve and facilitate the generation of airflow along a predetermined path by spindle and disk rotation.

Yet another object of the present invention is to provide a low-profile optical encoder subsystem within the housing of the head and disk assembly for providing polyphase electrical signals for generating position information for the data transducer relative to the housing.

Still one more object of the present invention is to provide a compact brushless direct drive spindle motor with its associated drive electronics on a small printed circuit board in a well in the housing next to the spindle motor, so that heat generated by the drive electronics may be sumped into and dissipated by the housing at a general location which does not interfere with other elements of the assembly.

One other object of the present invention is to provide a compact head and disk assembly which may be manufactured at low cost, which may be adapted and used for a wide variety of data storage environments, which operates reliably over an extended useful life, and which requires little or no maintenance.

These objects are achieved in a compact, sealed head and disk assembly for a rotating non-removable disk data storage subsystem. The assembly includes the following elements:

A flat and thin rigid generally rectangular box housing is provided for aligning, mounting and substantially enclosing the elements providing the head and disk assembly. The box housing is thinner in its height dimension than heretofore known, (e.g. approximately 6¾ inches in length (173 mm), approximately 4 inches in width (102 mm) and approximately one inch high (24.5 mm).

A thin spindle motor is mounted in the housing and has a spindle rotatable at a predetermined proper angular velocity.

At least one magnetic media data storage disk is mounted directly to the spindle for rotation in the housing.

A limited angular displacement rotary actuator subassembly is enclosed by the housing and includes a rotary actuator motor comprising a coil, a first flux return plate mounted to the housing; a first permanently magnetized flux providing flat plate magnet mounted adjacent to and within the locus of movement of the coil, the first magnet having a plurality of magnet pole regions at a major surface thereof facing the coil, the first magnet being mounted to the first flux return plate so that the first plate returns the flux between pole regions of the first magnet at a surface thereof facing the first plate; a second flux return plate mounted to the housing in alignment with and spaced away from the first flux return plate and first magnet; and, a second permanently magnetized flux providing flat plate magnet mounted adjacent to and within the locus of movement of the coil, and having a major surface facing the major surface of the first magnet across a gap slightly greater than the thickness of the coil and having a plurality of magnetic pole regions on the major surface complementary with the oppositely facing poles of the first magnet.

The coil is freely moveable along its locus of limited displacement in the flux gap formed between the opposed major faces of the first and second magnets, and the coil includes windings which are disposed to cut the flux lines of the aligned plural polar regions of the magnets.

Thus, the first and second magnets provide a magnetic flux field in the gap, the lines of which are cut by the coil; and, the flux return plates contain the flux to the vicinity of the flux gap and thereby prevent the flux from the rotary actuator motor from reaching the data storage disk.

The limited displacement rotary actuator further includes a unitary planar actuator frame which is journalled to the housing and is rotatable in alignment with the plane of the data storage disk. The frame includes at least three regions. A first region supports the coil of the rotary actuator motor. A second region supports a data transfer arm carrying a data read and write transducer in close proximity to concentric data tracks formed on the disk data storage surface. And, a third region carries a counterweight for countering any imbalances presented by the presence of the first and second regions, thereby presenting a constant torque load to the rotary actuator motor irrespective of orientation of the head and disk assembly.

Finally, a cover is provided for closing and sealing the housing, thereby preventing particulate contaminants from entering and interfering with the flying head data transducer or other delicate elements of the head and disk assembly.

In one specific aspect of the present invention the spindle motor includes a grounding connection for grounding the spindle and data disk to the housing which is coaxially disposed within the spindle, thereby promoting overall thinness in height of the spindle motor.

Another aspect of the present invention is that rotation of the data storage disk generates airflow by centrifugal force along a path defined within the housing, generally along the periphery of said disk.

A further aspect of the present invention calls for interior shroud surfaces defined by the housing which are located adjacent to peripheral regions of the disk for directing and promotiong airflow along the path.

Still another aspect of the present invention is the placement of a particulate filter in the airflow path within the housing, for filtering out any particulate contaminants as may be present in the sealed head and disk assembly during operation thereof.

Yet one more aspect of the present invention is to place the particulate filter in the airflow path in an interior corner of the rectangular housing adjacent to the periphery of the data storage disk so that rotation of the disk generates and promotes airflow through said filter.

Still one more aspect of the present invention provides for an auxiliary, low mass, airflow generator disk which mounted to the spindle at a location adjacently spaced away from the data storage disk so that the generator disk cooperates with the data storage disk for promoting airflow along the predefined airflow path by disk rotation.

Yet one more aspect of the present invention provides for a release mechanism in the housing for releasing the rotary actuator subassembly from a landing zone position in response to airflow generated by disk rotation.

Yet another aspect of the present invention provides for an interior opening in the substantially planar unitary rotary actuator frame generally between the first and second regions; and a single post is mounted to the housing and is disposed within the interior opening so that the post may engage opposed interior walls of the actuatory frame to keep it within its range of limited displacement.

Still another aspect of the present invention provides for an optical position encoder subsystem mounted in the housing for generating polyphase electrical signals indicating position of the actuator subassembly relative to the housing; the optical position encoder subsystem includes a limited displacement moving scale. At the same time the actuator frame indicates a fourth region to which the moving scale is mounted, and the actuator counterweight is adapted to counter any imbalance presented by the fourth region and by the scale mounted thereto.

Another aspect of the present invention provides for placement and mounting of drive electronics for the spindle motor in an exterior well of the housing adjacent to the spindle motor to facilitate access to the circuit and so that heat generated thereby during operation may be dissipated by the housing.

These and other objects, advantages and features will be further understood and appreciated by considering the following detailed description of a preferred embodiment, presented in conjunction with the accompanying drawings.

DETAILED DESCRIPTION OF A PREFERRED EMBODIMENT

Figure 1:
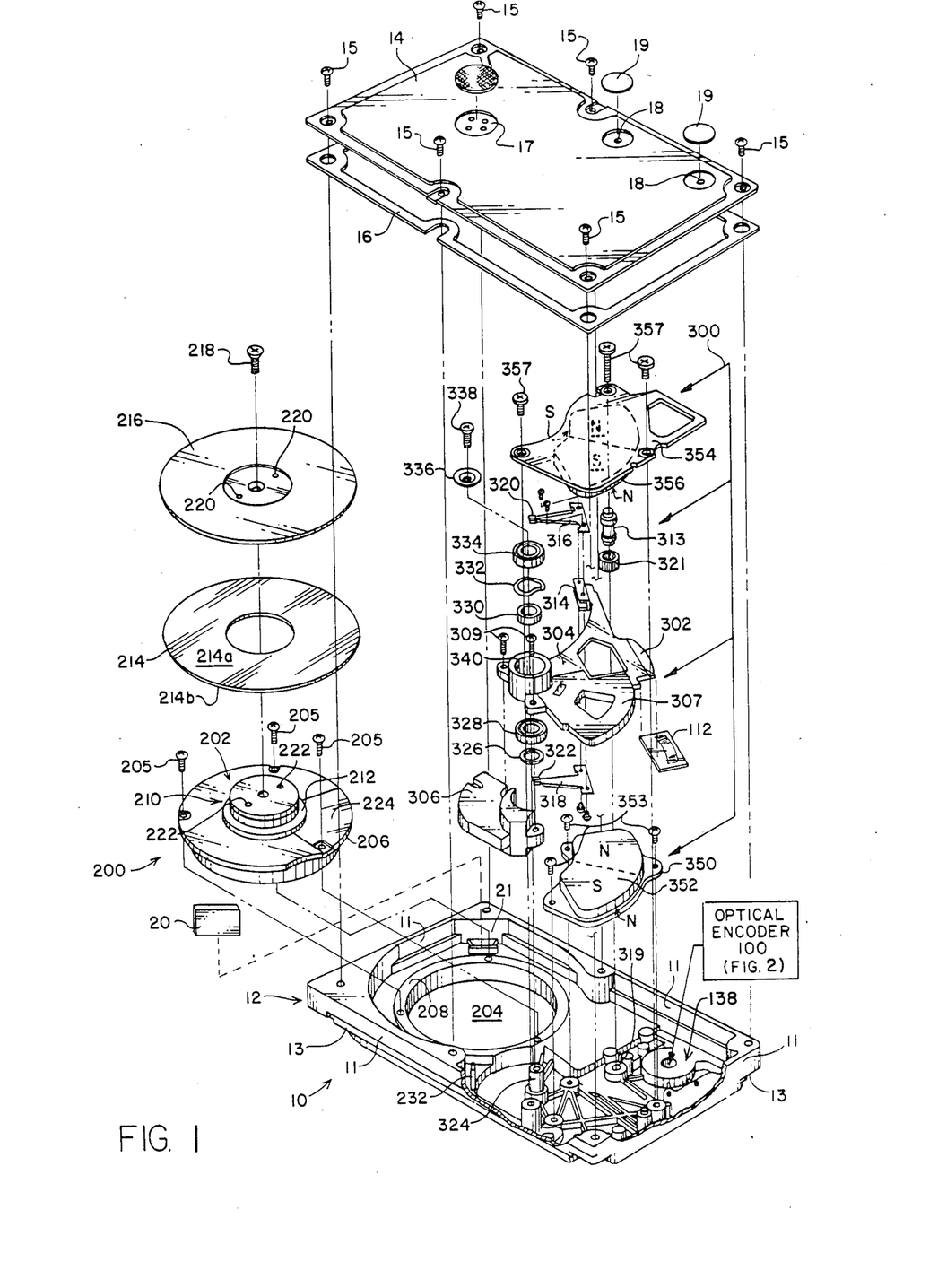
FIG. 1 is a somewhat diagrammatic and exploded view in perspective of an assembly of the elements comprising the head and disk assembly incorporating the principles of the present invention. The elements depicted in FIG. 1 have been dispersed along broken explosion lines to facilitate illustration of the heat and disk assembly.

A compact head and disk assembly 10, incorporating the principles of the present invention, is depicted in overview in FIG. 1. In FIG. 1, the assembly 10 is shown as including a housing 12, which functions to enclose, align, and/or support all of the other elements included as part of the assembly 10. The housing 12 is preferably formed as a metal casting, such as of aluminum. The housing 12 may also be formed from stock by machining, and may also be formed by sintering of formed powdered metal, in accordance with known technology. A continuous outer peripheral wall 11 and recesses 13 (FIG. 5) serve to reinforce the housing 12 and also to minimize the amount of material required in its fabrication.

A cover 14 attaches to the housing 12 via screws 15 and thereby encloses the interior thereof. The assembled housing 12 and cover 14 are typically quite compact: approximately 6¾ inches in length (173 mm), approximately 4 inches in width (102 mm) and approximately one inch high (24.5 mm). A gasket 16 seals the interior of the housing 12 from the ambient, and prevents intrusion of foreign particulate material, such as dust, which would interfere with the operation of the assembly 10. A breather filter 17 enables the pressure inside the housing 12 to equalize to exterior ambient. Two ports 18 are provided through the cover 14 to enable the interior to be purged of dust particles during the manufacturing operation. Seals 19 seal the two ports 18 after purging.

A micropore air filter 20 is mounted in one corner 21 of the housing 12 and filters internal air to remove any particulate contamination during operation.

The head and disk assembly 10 includes three major elements or subsystems: an optical encoder subassembly 100 described in connection with FIG. 2; a disk, spindle and direct drive spindle motor subassembly 200 described in connection with FIGS. 1 and 3-6, and a rotary actuator and motor subassembly 300, described in connection with FIGS. 1, 3, 4, 7, and 8.

Optical Encoder Subassembly 100

Figures 3, 4:
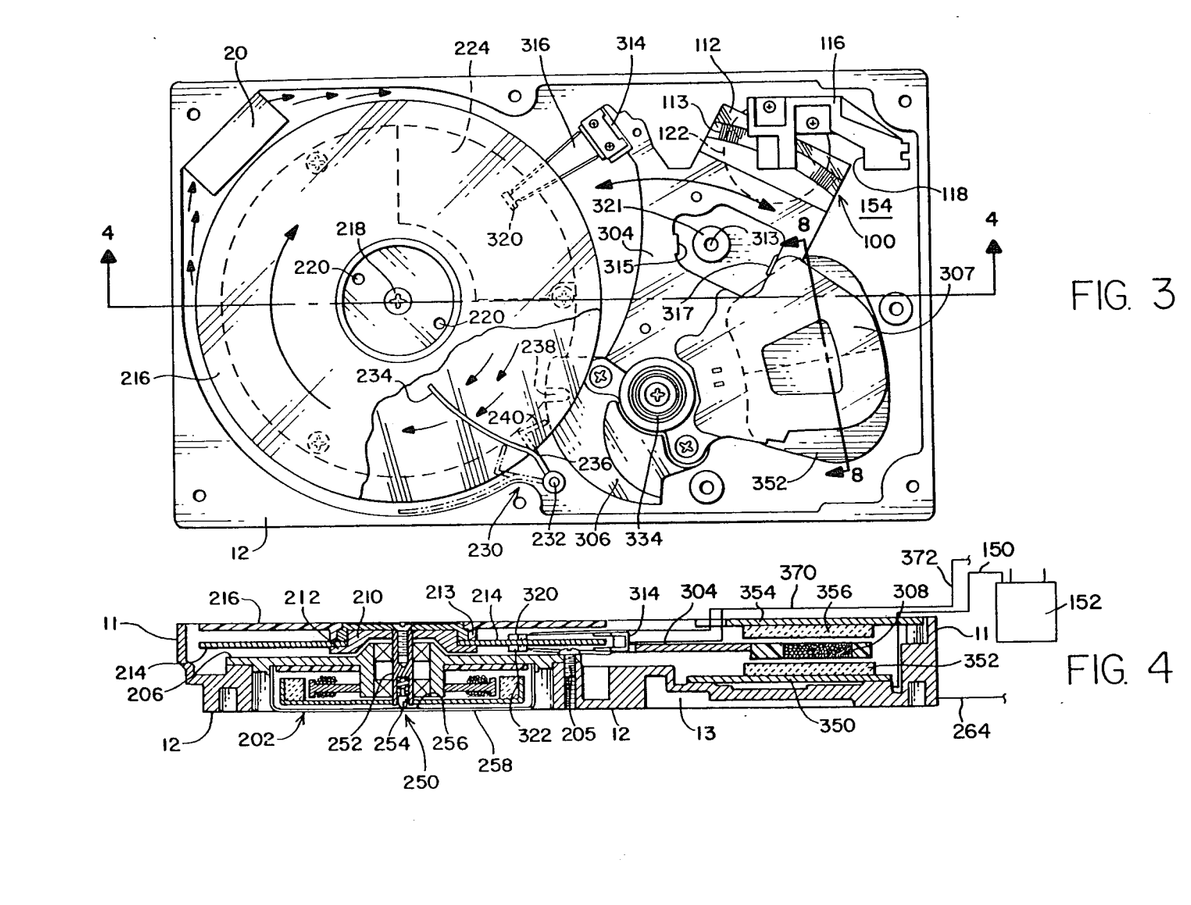
FIG. 3 is a diagrammatic top plan view of the head and disk assembly depicted in FIG. 1, showing the elements thereof in place, except for the upper magnet and flux return plate, and certain flexible connection substrates which have been omitted to facilitate clarity of explanation and understanding.
FIG. 4 is a longitudinal view in side elevation and section of the assembly of FIG. 1 through the axis of rotation of the spindle motor. The section is along the line 4—4 in FIG. 3.

The enclocder subassembly 100 includes three major parts. The first part is a moving scale 112 having alternating light translucent and opaque radial microlines 113. The scale 112 is mounted on a ledge 302 of a substantially planar rotary actuator frame 304 of limited angular displacement which is rotatably journalled to the housing 12 as shown in FIGS. 1 and 3, and discussed hereinafter in greater detail. Thus, in this preferred embodiment the scale 112 is also of limited angular displacement, limited to a maximum of approximately thirty degrees of arc (30°).

The second part of the encoder 100 is a unitized encoder structure 114 comprising a light source holder 116 carrying an LED light source 118 and a mirror 120, a photocell array carrier 122 carrying and aligning a photocell array 124 and an overlying mask or reticle 126, a support bolt 128 having a widened circular head or table top 130 for mounting the light source holder 116 and the photocell array carrier 122 and having a threaded cylindrical shank 132. A wave spring washer 134 is interposed between a bottom surface of the bolt 128 opposite the surface 130 and an annular machined plateau 136 surrounding a cylindrical opening formed through a bottom wall portion 138 of the housing 12.

The cylindrical opening is sized to receive the shank 132 therethrough in a freely rotating relationship. A height adjusting nut 140 threads onto the shank 32 after it is passed through the base 38 so as to enable the bolt 128 to be height trimmed relative to the scale 112 and to retain the bolt 128 to the base 138.

Figure 2:
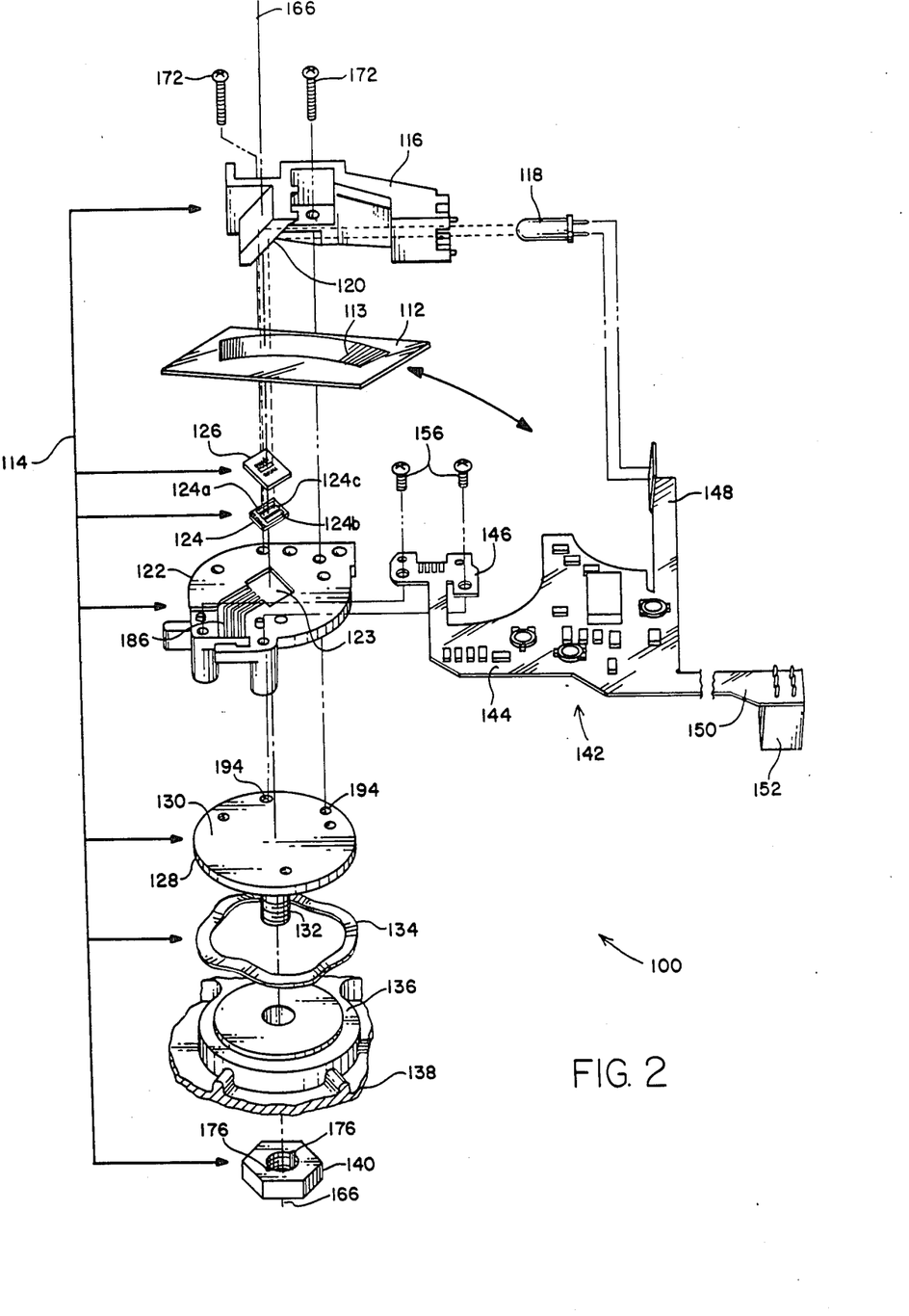
FIG. 2 is an exploded diagrammatic view in perspective along a single central axis of explosion of the structural elements comprising a compact optical encoder subassembly incorporated within the head and disk assembly depicted in FIG. 1.

The LED light source holder 116 is secured to the support bolt 128 by screws 172 which pass through the holder 116, and also through the photocell array carrier 122 and into threaded openings 194 provided in the table top 130 of the support bolt 128, as shown in FIG. 2.

The photocell array carrier 122 includes a central well 123 in which the photocell array 124 is mounted. A small printed circuit board 186 is provided adjacent to a connection edge of the photocell array 124. Fine wires are then bonded between connection pads of the array 124 and corresponding traces of the circuit board 186. The reticle 126 is then directly mounted over the photocell array 124 in precise optical alignment, so that openings in the reticle 126, in cooperation with the radial microlines 113 of the scale 112, enable generation of polyphase incremental position electrical signals which are related to the position of the actuator frame 304 relative to the housing 12.

The threaded shank 132 of the bolt 128 passes through the housing at the region 138 shown in FIGS. 1 and 2. The bolt 128 includes a slot 174 (FIG. 5) formed in the lower end thereof adjacent to the threaded shank portion for receiving a mating alignment tool (not shown) which enables the encoder assembly 114 to be rotated during final assembly and optical alignment in the housing 12. The nut 140 enables the assembly 114 to be adjusted to a precise height relative to the scale, by virtue of compression of the wave spring washer 134. The nut 140 includes two transverse grooves 176 at its threads. These grooves 176 enable the nut 140 to be glued effectively to the bolt 128 and to the housing 12 once proper alignment of the encoder 114 and scale 112 is achieved during the manufacturing process.

The third part of the assembly 10 is an electronic circuit 142 which is preferably formed of electronic components secured to a flexible film printed circuit substrate 144. The substrate 144 is adapted to be placed inside the housing 12 adjacent to the encoder subassembly 100, in a well generally designated by the reference numeral 154 in FIG. 3.

The substrate 144 includes three integral flexible connection extensions, a first extension 146 enabling connection to the photodetector array 124 via the small circuit board 186 by screws 156 at the locations indicated by the broken lead lines in FIG. 2. A second extension 148 extends to and enables connection of the circuit 142 to the LED light source 118, and a third extension 150 includes a suitable plug 152 for enabling direct overall electrical connection of the subassembly 110 to the disk drive control electronics with which the head and disk assembly 10 may be used. This connection via the plug 152 is external to the housing 12, and the thin film extension 150 passes between the housing 12 and the gasket 16 to the external connection location, with the electrical traces being adjacent to the insulating gasket 16 and with the mylar substrate being against the lip of the housing 12.

Further details of the optical encoder subassembly 100 are set forth in the referenced co-pending U.S. patent application, Ser. No. 06/741,179, now U.S. Pat. No. 4,703,176, entitled Improved Optical Encoder Assembly, the disclosure of which is hereby incorporated by reference at this location in this specification.

Disk and Spindle Motor Subassembly 200

The disk and spindle motor subassembly 200 includes a very thin and flat direct drive, brushless spindle motor 202 which mounts in a well 204 of the housing 12 by three screws 205. The screws 205 pass through openings in a peripheral flange 206 of the motor 202 which mates a machined annular surface 208 adjacent to the open well 204. The lower surface of the flange 206 and the facing surface 208 of the housing 12 are machined, so that the motor 202 is thereby sealed in an airtight arrangement with the housing 12.

The motor 202 includes a rotating hub 210 which has a lower flange 212. A data storage disk 214 mounts over the hub 210 and against the flange 212. The flange 212 has a height adapted to align the data disk 214 properly within the interior of the housing 12. The disk 214 is coated on both major surfaces with a magnetic storage material such as a ferrous oxide or plating and provides the storage medium of the compact head and disk assembly 10. In the preferred embodiment, the disk has a diameter of approximately 95 millimeters (a disk size sometimes characterized as "micro-Winchester", see e.g. U.S. Pat. No. 4,568,988), and has the capability of easily storing in excess of ten million bytes of formatted data.

An airflow generator disk 216, preferably formed of a low-mass plastic material, attaches to the top of the hub 210 by a single axial locking screw 218. Two opposed peripheral openings 220 through the disk 216 align with two openings 222 on the top of the hub 210. A spanner wrench is used to prevent the hub 210 from rotating while the screw 218 is tightened. The spanner wrench is provided with two pins aligned with the openings 220 and 222. The pins pass through the openings 220 and 222 and thereby align the top disk 216 and the hub 210 as the screw 218 is locked into place. A spacer 213 (FIG. 4) between the top disk 216 and the data disk 214 locks the data disk 214 against the lower flange 212.

The top surface of the spindle motor 202 includes a recessed and shielded region 224, in which an electromagnetic shield is placed, in order to prevent contamination of data stored on the lower surface by the electromagnetic fields generated inside of the motor 202.

As seen in FIG. 3, an aerodynamically released shipping latch 230 is rotatably mounted on a vertical post 232 (FIG. 1) in the housing 12. A vane 234 and flag 236 of the latch 230 are deflected by airflow generated by clockwise rotation of the disks 214 and 216. The airflow is sufficient to overcome the force exerted by a bias spring (not shown) which urges the latch 230 in a clockwise direction. A notch 238 provided in a counterweight 306 of the rotary actuator 300 is engaged by a finger 240 when there is no rotation of the disks 214 and 216 (and no airflow). This arrangement latches the rotary actuator 300 into a landing zone position.

Further details of the aerodynamic latch are set forth in co-pending U.S. patent application Ser. No. 06/728,674, filed on Apr. 29, 1985, now U.S. Pat. No. 4,647,997, entitled "Aerodynamic Latch For Disk File Actuator", the disclosure of which is incorporated herein by reference at this point in this specification.

When power is removed from the head and disk assembly, the counter electromotive force generated by rotation of the spindle motor 202 in response to the inertia stored in the motor 202, spindle 210 and disks 214, 216, is automatically applied to the rotary actuator 300 in order to return the actuator to the landing zone position before disk rotation ceases and the aerodynamic latch 230 is no longer deflected by airflow.

One important requirement for the head and disk assembly 10 is that the spindle 210 be effectively grounded to the frame 12. Ordinarily, an electrical brush makes contact between the spindle shaft and the housing external to the motor. However, such arrangement adds significantly to the height of the motor and to the overall thickness of the head and disk assembly. Thus, it has been discovered that a grounding mechanism 250 (FIG. 4) may be placed entirely within the spindle shaft 252 of the motor 202.

The preferred mechanism includes a spring loaded ball or tip 254 inside the hollow spindle shaft 252. The tip 254 is of conductive material, such as a carbon impregnated plastic resin material, and it makes direct contact with a pad 256 of highly conductive hardened material such as stainless steel which is fixed and connected to the stationary enclosure 258 of the motor 202. The enclosure 258 is grounded to the housing 12 at the peripheral flange 206 by the screws 205.

Figure 5:
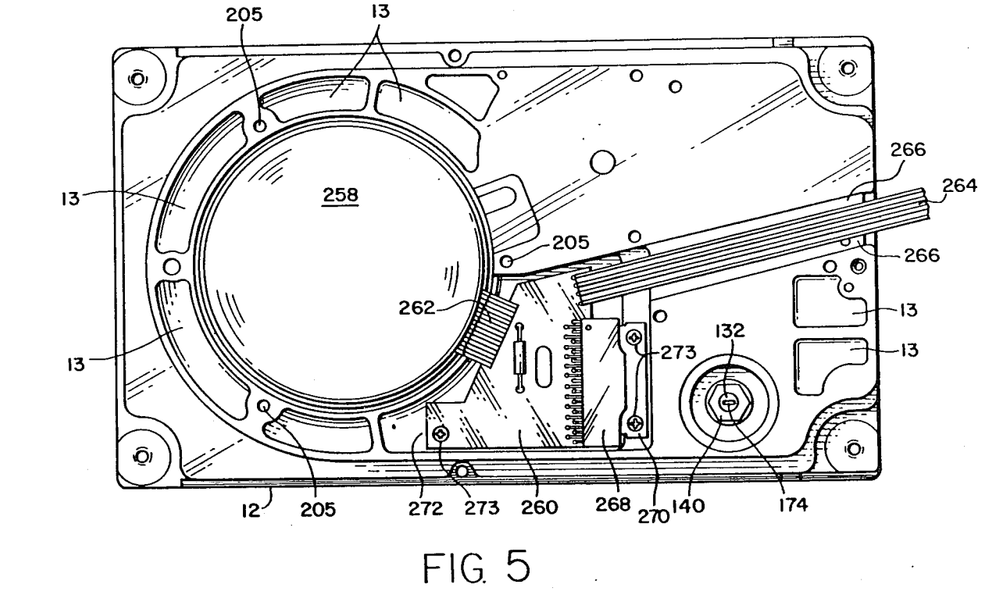
FIG. 5 is a diagrammatic bottom plan view of the head and disk assembly depicted in FIG. 1.

One important aspect of the present invention is that the electronic circuitry required to drive the multiple windings of the spindle motor 202 be thermally sinked directly to the housing. The arrangement shown in FIG. 5 makes direct heat sinking of the driving circuitry to the housing 12 possible. In FIG. 5, a small printed circuit board 260 connects to a cable 262 from the motor 202 and also connects externally of the head and disk assembly 10 via a cable 264 disposed in a channel 266 formed in the back of the housing 12.

An integrated circuit motor driver 268 having its pins connected to the circuit board 260 as shown in FIG. 5 includes a flange 270 which is directly mounted to the back of the housing 12 in a well 272 formed in the housing with a sufficient depth from the lower surface profile in order to hold the circuit board 260 and its components (FIG. 6c) most of which are located on the underside of the board 260. Screws 273 secure the heat sink flange 270 of the integrated circuit directly to the housing 12 inside the well 272.

Figure 6A:
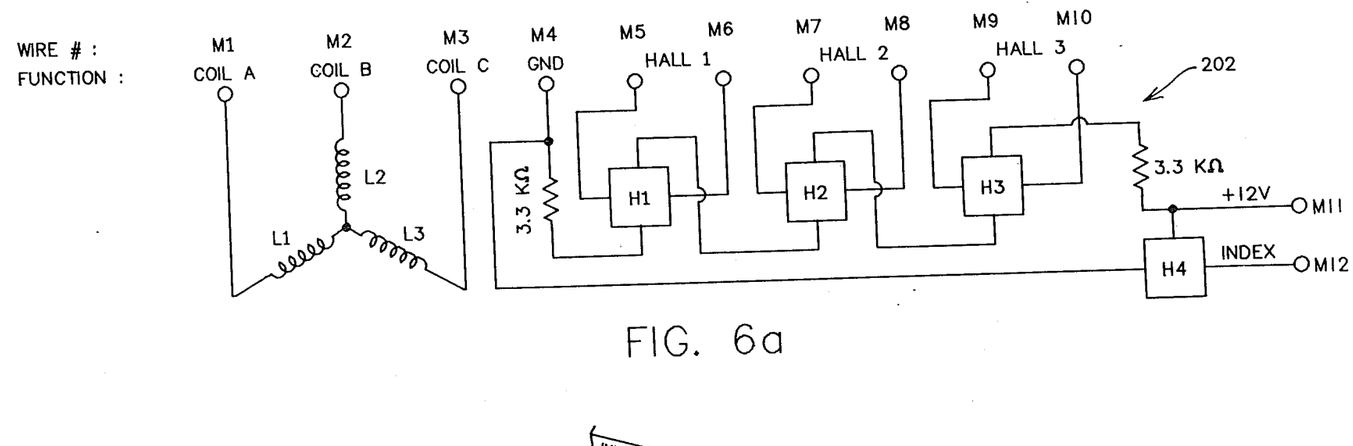
FIGS. 6a, 6b and 6c are respectively an electronic schematic circuit diagram of the three phase, brushless spindle motor depicted in FIG. 1; an electronic schematic circuit diagram of a driver circuit needed to operate and commutate the brushless DC spindle motor; and, a bottom or inside plan view of one preferred layout of a small circuit board for carrying the circuitry depicted in FIG. 6B.

The circuitry for the three phase motor 202 is depcicted in FIG. 6a, which indicates that the motor is Y wound and generates three phase commutation signals by Hall effect generators responsive to a small permanent magnet disposed in the rotating permanent magnet armature of the motor, as is conventionally known and understood. A fourth Hall effect transducer H4 generates and puts out a once per revolution index signal which is ultimately supplied to the control electronics external to the head and disk assembly 10.

Figure 6B:
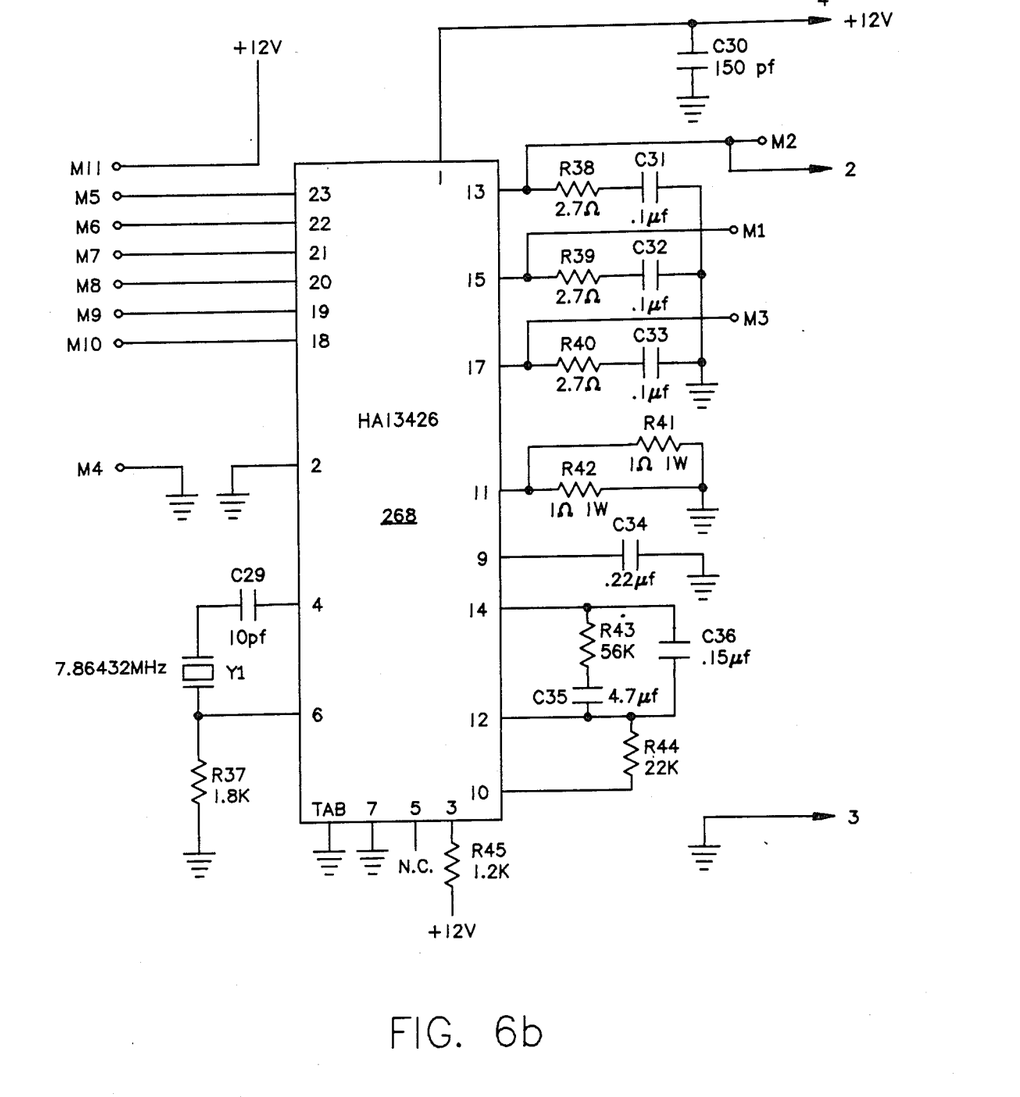
Figure 6C:
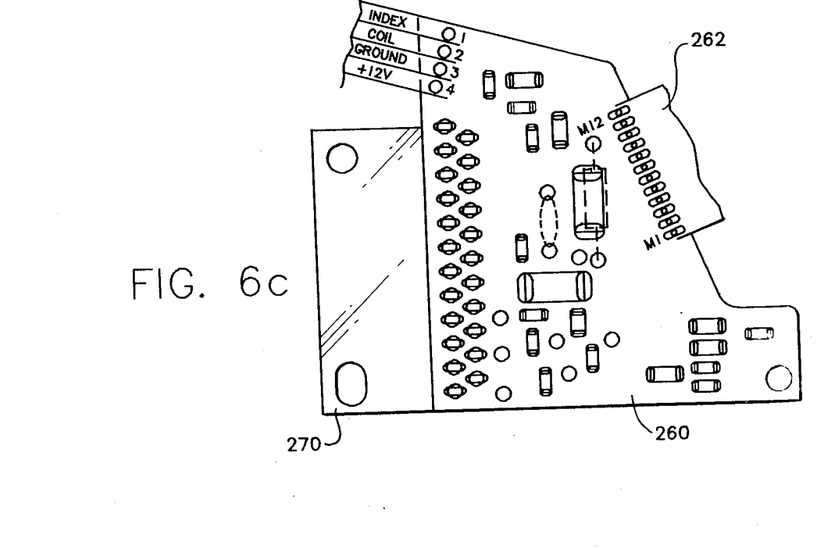

The circuitry for operating the driver 268 is depicted in FIG. 6b, and this figure is self explanatory to those skilled in the art when it is studied in conjunction with FIG. 6a. A bottom or inside plan view of the circuit board 260 (FIG. 6c) indicates one acceptable form of layout for the discrete components on the circuit board 260, in which all but two of the discrete components are mounted between the printed circuit board and the facing bottom wall of the housing 12. This arrangement protects these components from physical harm, and it enables ready attachment of test equipment should troubleshooting of the circuit carried on the board 260 ever be required.

Rotary Actuator Subassembly 300

The third major subassembly of the head and disk assembly is a very flat and thin rotary actuator subassembly 300, depicted in various levels of detail in FIGS. 1, 3, 4, 7 and 8. As already mentioned, the actuator 300 includes a planar frame 304, preferably formed of cast or stamped aluminum. The frame 304 includes four regions. The region 302 for supporting the scale 112 of the optical encoder 100 has already been discussed.

Figure 7:
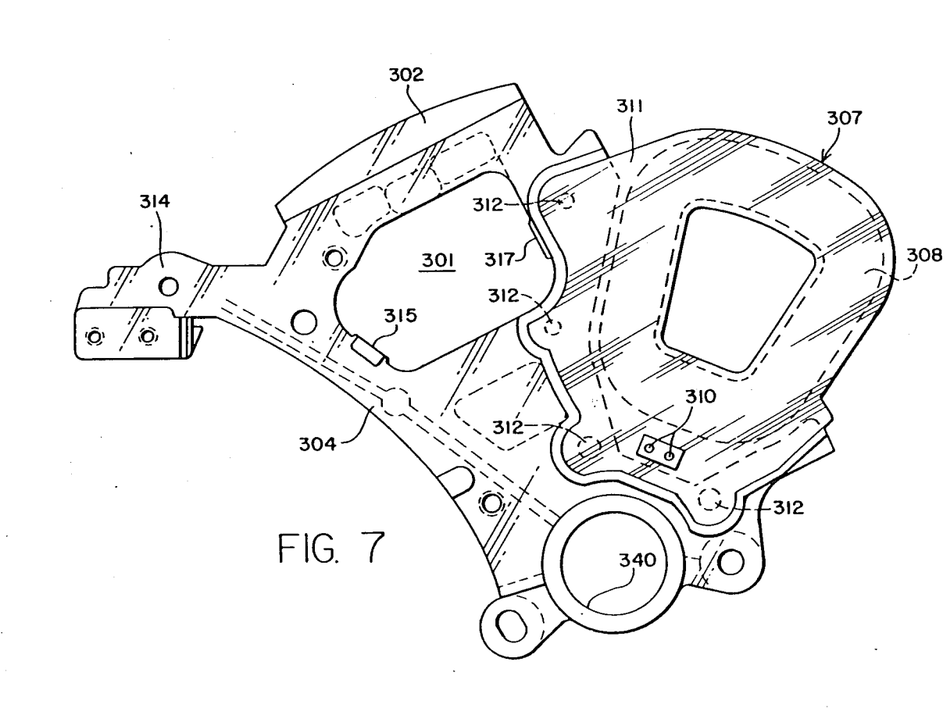
FIG. 7 is an enlarged top plan view of a rotary actuator element of the head and disk assembly depicted in FIG. 1.

A second region of the frame 304 is for aligning and supporting a triangular electromagnetic coil 307 of a single winding 308 whose two ends are connectable at connection pins 310. The coil 307 is wound on a bobbin and is then integrally molded to the frame 304 with a suitable molding compound 311. Regions 312 denote holes passing through the frame 304 which are filled with potting material during the molding process, so that the coil 307 may be precisely aligned both radially and in the planar dimension relative to the frame 304.

A third region of the frame 304 provides a support extension 314 for two arms 316, 318 supporting respectively two oppositely facing "flying head" data tranducers 320, 322 which are disposed in proximity to the two major, data storage surfaces of the data disk 214, as shown in FIG. 4. During rotation of the disk 214, the transducers 320, 322 ride or "fly" upon an air bearing in very close proximity to the data surface in accordance with what is known as "Winchester" technology.

The fourth region of the frame 304, already mentioned, supports the counterweight 306, whose mass is selected to counterbalance the other regions of the frame 304, and also to cooperate with the aerodynamically released shipping latch 230, also previously explained. The counterweight 306 is attached to the frame 304 by screws 309 and includes at least a portion vertically interlaid between the data storage disk 214 and a floor portion of the housing 12.

The actuator frame 304 includes a central opening 301 which reduces its mass and inertia, and which provides a convenient location for a single crash stop post 313 which is adapted to engage oppositely facing surfaces 315, 317 formed on the inside walls of the frame 304 which define the opening 301. The post 313 is press fit into a suitable opening 319 in the housing 12. A cylinder rubber gasket 321 slips over the post 313 and dampens the impact of the frame 304 upon the post 313. The crash stop post 313, in combination with the arc length between the surfaces 315, 317, limits the displacement of the actuator 300 to a predetermined maximum. This limitation of displacement is essential to prevent the transducers from coming off of the data disk 214, and from crashing into the lower flange 212 of the spindle hub 210.

A rotary actuator spindle includes a fixed shaft 324 mounted upwardly from the housing 12. A washer 326, a lower bearing 328, a spacer 330, a wave spring washer 332, an upper bearing 334 and a locking washer 336 and screw 338 all cooperate to provide a freely rotating journal for the actuator frame 304. These elements are mounted and contained in an axial cylindrical opening 340 provided through the frame 304 and enable the frame 304 to move across an arc of approximately thirty degrees and thereby move the transducers radially across the data surfaces of the data disk 214 so that each of the multiplicity of concentric data tracks formed on each data surface of the disk 214 may thereby be accessed by operation of the rotary actuator 300.

Figure 8:
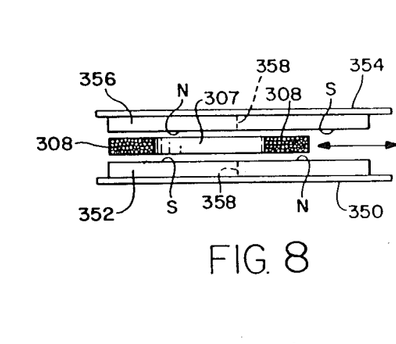
FIG. 8 is a diagrammatic view in side elevation and section of a portion of the rotary actuator motor, taken along the line 8—8 in FIG. 3.

A lower flux-return magnet plate 350 carrying a lower permanent magnet 352 is mounted to the housing 12 by screws 353; and, an upper flux-return magnet plate 354 carrying an upper permanent magnet 356 is mounted to the housing 12 by screws 357. As seen in FIG. 8, the coil 37 is disposed between the two oppositely facing permanent magnets 352 and 356.

Each magnet 352, 354 is magnetized to have two regions of pole reversal. The magnetic poles are at the major surfaces of the magnets 352, 354, and are complementary with each other so that a very strong flux region exists between the two opposed faces of the two magnets 352 and 356. A polar reversal region 358 generally bisects each magnet 352, 354. This is so that the effect of the flux on e.g. the left side (FIG. 8) on the coil 307 with current passing through it adds to the effect of the flux on e.g. the right side, since current will be passing through the single winding 308 in one direction only.

A thin, highly flexible mylar circuit connection film 370 is provided for connection of the data transducers 320, 322. This connection film extends from a larger flexible mylar printed circuit which is preferably mounted on the upper flux return plate 354 and which carries some of the read and write drive circuitry required for operating the transducers 320, 322. A connection extension 372 for the mylar circuit extends outwardly from the drive HDA between the gasket 16 and the upper face of the peripheral wall 11 along the same lineal edge thereof (FIG. 4) as passes the connection portion 150 for the optical encoder subassembly 100.

Control Electronics

Electronic circuitry suitable for the control of the head and disk assembly is disclosed in the above-referenced U.S. Pat. No. 4,639,798, the disclosure of which is incorporated herein by reference at this particular location in the specification.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. A self-contained micro-Winchester compact head and disk assembly (HDA) module comprising:
    an enclosed, generally rectangular box housing having an overall maximum height not greater than 24.5 millimeters, the HDA module including entirely within said housing and supported by support means therewithin:
    electronically commutated DC brushless spindle motor means having a rotatable spindle, two non-removable disks secured in parallel plane, spaced apart relationship wherein at least one of said disks is a magnetic media data storage disk, the said overall maximum height dimension being perpendicular to the parallel planes of said disks, and
    a mass balanced direct drive electromechanical rotary actuator structure having an axis of rotation parallel to the axis of rotation of the rotatable spindle for positioning data read/write transducer means to each selectable one of a multiplicity of concentric data tracks formed on a data storage surface of the data storage disk,
    there being a single data read/write transducer means for each surface of said data storage disk, and electrical interconnect means leading from said HDA module for providing electrical connections to said DC brushless spindle motor means, said electromechanical rotary actuator structure and to each said data read/write transducer means.

2. The micro-Winchester compact HDA module set forth in claim 1 wherein said electromechanical rotary actuator structure comprises:
    a rotary voice coil actuator motor located oppositely away from the data storage disk and including:
    a coil,
    a first flux return plate mounted to said support means,
    a first permanently magnetized flux providing flat plate magnet mounted adjacent to and within the locus of movement of said coil, said first magnet having a plurality of magnetic pole regions at a major surface thereof facing said coil, said first magnet being mounted to said first flux return plate so that said plate returns the flux between pole regions of said first magnet at a surface facing said first plate,
    a second flux return plate mounted to said support means in alignment with and spaced away from said first flux return plate and first magnet,
    a second permanently magnetized flux providing flat plate magnet mounted adjacent to and within the locus of movement of said coil, and having a major surface facing the major surface of said first magnet across a gap slightly greater than the thickness of said coil and having a plurality of magnetic pole regions on said major surface complementary with the oppositely facing poles of said first magnet,
    said coil being freely moveable along its locus of limited displacement in said gap and having windings disposed to cut the flux of said regions,
    whereby said first and second magnets provide a magnetic flux field in said gap the lines of which are cut by the coil and said flux return plates contain said flux to the vicinity of said gap and prevent said flux from reaching said data storage disk; and
    a unitary planar frame journalled to said support means and rotatable in alignment with the plane of said data storage disk, said frame comprising:
    a first region supporting said coil of said rotary actuator motor,
    a second region supporting a data transducer arm carrying a data read and write tranducer in close proximity to concentric data tracks formed on said disk surface, and
    a third region carrying a counterweight for mass balancing any imbalances presented by the presence of said first and second regions, thereby presenting a constant torque load to said rotary actuator motor irrespective of orientation of said head and disk assembly.

3. The micro-Winchester compact HDA module set forth in claim 2 wherein the frame of the actuator structure defines an interior opening between said first, and second regions, and further comprising a single post mounted to the floor of said housing and disposed within said interior opening, the frame being adapted to contact said single post to limit the range of limited rotational displacement of the actuator structure.

4. The micro-Winchester compact HDA module set forth in claim 3 wherein said second flux return plate is mounted at one corner thereof to the housing via attachment to said single post.

5. The micro-Winchester compact HDA module set forth in claim 1 further including optical position encoder subsystem means mounted inside of said housing, for generating analog polyphase signals indicating position of said electromechanical actuator structure relative to said housing, wherein the encoder subsystem includes a unitized light source-photodetector array mounted to a floor portion of the housing, and wherein the frame of the actuator structure includes a region to which a limited displacement, micro-line moving scale is mounted.

6. The micro-Winchester compact HDA module set forth in claim 1 further comprising a shallow well formed in an exterior surface of said housing adjacent to said spindle motor, and spindle motor commutation and drive electronics mounted in said well so that any heat generated thereby may be directly sumped into said housing and dissipated therefrom.

7. The micro-Winchester compact HDA module set forth in claim 1 wherein said transducer means includes read/write drive circuitry formed on a flexible printed circuit and at least one data transducer connected to said circuitry via said circuit.

8. The micro-Winchester compact HDA module set forth in claim 1 wherein said electrical interconnect means extends from along a single edge wall of said HDA module.

9. The micro-Winchester compact HDA module set forth in claim 1 wherein the length of said enclosed, generally rectangular box housing is 173 millimeters, wherein the width is 102 millimeters, and wherein the height is 24.5 millimeters.

10. The micro-Winchester compact HDA module set forth in claim 1 wherein said enclosed, generally rectangular box housing comprises a generally rectangular, unitary base casting having integral sidewalls defining an interior, and by removable cover means for enclosing and sealing an open end of said base casting, and wherein said support means comprises a bottom portion of said base casting, said spindle motor means being secured within a well defined within said bottom portion and said rotary actuator structure being journalled to a post mounted in a cavity defined within said bottom portion.

11. The micro-Winchester compact HDA module set forth in claim 1 wherein said mass balanced, direct drive electromechanical rotary actuator structure includes a counterweight having a mass selected and placed to counterbalance other regions of said actuator.

12. A self-contained, plug-in micro-Winchester compact head and disk assembly (HDA) module for use with external disk drive control electronics, the plug-in HDA module including plural internal electromechanical means including disk rotation means for rotating a plurality of disks, at least one of which is a data storage disk having a storage capacity in excess of ten megabytes of data, at a predetermined, substantially constant angular velocity and mass balanced, direct drive rotary voice coil electromechanical actuator head positioning means for positioning a plurality of commonly mounted, moveable data transducer means at selected ones of a plurality of concentric track locations on the data storage disk so that data may be written to and read from a track location by a selected one of the data transducer means, the HDA module further comprising a generally rectangular box housing having an overall maximum height not greater than 24.5 millimeters as measured perpendicularly to parallel planes in which said disks lie, the HDA module defining an enclosed interior chamber for providing support structure for mounting and containing said plural electromechanical means and said data transducer means, said HDA module including electrical connection means extending therefrom and adapted for plug-in connection of said data transducer means and said electromechanical means to said disk drive control electronics.

13. The self-contained, plug-in micro-Winchester HDA module for use with external disk drive control electronics set forth in caim 12 further comprising optical encoder means adjustably mounted within said housing and contained within said chamber and having a microline scale mounted to said head positioning means and cooperating with said optical encoder means for translating the radial position of the data transducer means relative to the data storage disk into plural, phase shifted electrical signals, said signals being carried on connection means extending exteriorly of said chamber and adapted for plug-in attachment to said external disk drive control electronics.

14. The self-contained, plug-in micro-Winchester HDA module for use with external disk drive control electronics set forth in claim 12 wherein the length of said enclosed, generally rectangular box housing is 173 millimeters, and wherein the width is 102 millimeters.

15. The self-contained, plug-in micro-Winchester HDA module for use with external disk drive control electronics set forth in claim 12 wherein said mass balanced, direct drive electromechanical rotary actuator head positioning means includes a counterweight having a mass selected and placed to counterbalance other regions of said actuator head positioning means.

* * * * *